US007316058B2

(12) United States Patent
Jee

(10) Patent No.: US 7,316,058 B2
(45) Date of Patent: Jan. 8, 2008

(54) COAXIAL CABLE STRIPPER

(76) Inventor: Beam-Chi Jee, No. 58, Chungshan Rd., Tucheng Industrial Park, Taipei County (TW)

( * ) Notice: Subject to any disclaimer, the term of this patent is extended or adjusted under 35 U.S.C. 154(b) by 362 days.

(21) Appl. No.: 11/203,191

(22) Filed: Aug. 15, 2005

(65) Prior Publication Data

US 2007/0037444 A1 Feb. 15, 2007

(51) Int. Cl.
*B23Q 23/00* (2006.01)
*H01R 9/05* (2006.01)

(52) U.S. Cl. ......................... 29/564.4; 29/745; 29/755; 29/866; 29/867; 29/33 F; 439/578

(58) Field of Classification Search ............... 29/564.4, 29/755, 758, 866, 867, 33 F; 439/578, 584, 439/874, 675; 81/9.41, 9.43, 9.42; 339/177 R; 30/90.1–90.4
See application file for complete search history.

(56) References Cited

U.S. PATENT DOCUMENTS

| | | | | |
|---|---|---|---|---|
| 4,241,496 | A * | 12/1980 | Gregson | 29/751 |
| 4,594,029 | A * | 6/1986 | Michael, III | 408/1 R |
| 4,616,533 | A * | 10/1986 | Wiener et al. | 81/9.41 |
| 5,632,088 | A * | 5/1997 | Naso et al. | 30/91.2 |
| 5,745,996 | A * | 5/1998 | Kenny et al. | 30/90.1 |
| 6,247,235 | B1 * | 6/2001 | Lawler | 30/90.4 |

* cited by examiner

*Primary Examiner*—A. Dexter Tugbang
*Assistant Examiner*—Tai Van Nguyen
(74) *Attorney, Agent, or Firm*—Rosenberg, Klein & Lee

(57) ABSTRACT

A coaxial cable stripper, which includes a hollow cylindrical body, which has two transverse through holes and two longitudinal sliding slots, a spring member fixedly mounted inside the hollow cylindrical body, and two movable cutter holders respectively supported on the spring member at two sides and axially movably coupled to the longitudinal sliding slots of the hollow cylindrical body, each movable cutter holder having a transverse through hole corresponding to the transverse through holes of the hollow cylindrical body for the insertion of a coaxial cable and two cutters for stripping off the outer and inner insulative layers of the inserted coaxial cable.

7 Claims, 8 Drawing Sheets

COAXIAL CABLE STRIPPER

BACKGROUND OF THE INVENTION

1. Field of the Invention

The present invention relates to a hand tool and more particularly, to a coaxial cable stripper, which is suitable for stripping off the outer and inner insulators of different sizes of coaxial cables.

2. Description of the Related Art

FIG. 9 shows a coaxial cable stripper according to the prior art. According to this design, the coaxial cable stripper comprises two pivoted handles 3, and two cutters 32 respectively affixed to the handles 3 and facing the gap 31 between the handles 3. When in use, the coaxial cable is put in the gap 31 between the two cutters 32, and then the handles 3 are pressed inwards to engage the two cutters 32 into the periphery of the coaxial cable, and then the coaxial cable stripper is turned through 360-degrees relative to the coaxial cable to strip off the insulative layer of the coaxial cable. FIG. 10 shows another structure of coaxial cable stripper according to the prior art. According to this design, the coaxial cable stripper comprises two handles 4 that have a respective middle part pivotally connected together, two clamping mouths 41 and 42 respectively defined between the handles 4 at the two distal ends, and two cutters 411 and 421 respectively affixed to one handle 4 corresponding to the two clamping mouths 41 and 42. Further, spring means (not shown) is provided between the two handles 2, keeping one mouth 41 in a normal close status. The operation of this structure of coaxial cable stripper is similar to the coaxial cable stripper shown in FIG. 9.

The aforesaid two designs are commonly heavy, not convenient for carrying in the pocket. Further, because the cutters are exposed to the outside, the cutters may injure the user accidentally during operation.

SUMMARY OF THE INVENTION

The present invention has been accomplished under the circumstances in view. It is the main object of the present invention to provide a coaxial cable stripper, which is suitable for stripping off the inner and outer insulative layers of different sizes of coaxial cables. To achieve this and other objects of the present invention, the coaxial cable stripper comprises a hollow cylindrical body, the hollow cylindrical body having an axial through hole extending through two distal ends thereof, and two transverse through holes extending across the axial through hole; a spring member fixedly mounted inside the axial through hole of the hollow cylindrical body on the middle; and two movable cutter holders respectively coupled to two distal ends of the axial through hole of the hollow cylindrical body and axially movable relative to the hollow cylindrical body and respectively stopped against two distal ends of the spring member, the movable cutter holders each having a transverse through hole corresponding to the transverse through holes of the hollow cylindrical body for the insertion of a coaxial cable, and two cutters fixedly mounted on the inside and respectively axially projecting into the transverse through hole of the respective movable cutter holder at different depths for stripping off the outer and inner insulative layers of a coaxial cable. Further, a clip is provided at the outside wall of the hollow cylindrical body for fastening.

DETAILED DESCRIPTION OF THE PREFERRED EMBODIMENT

Figure 1:
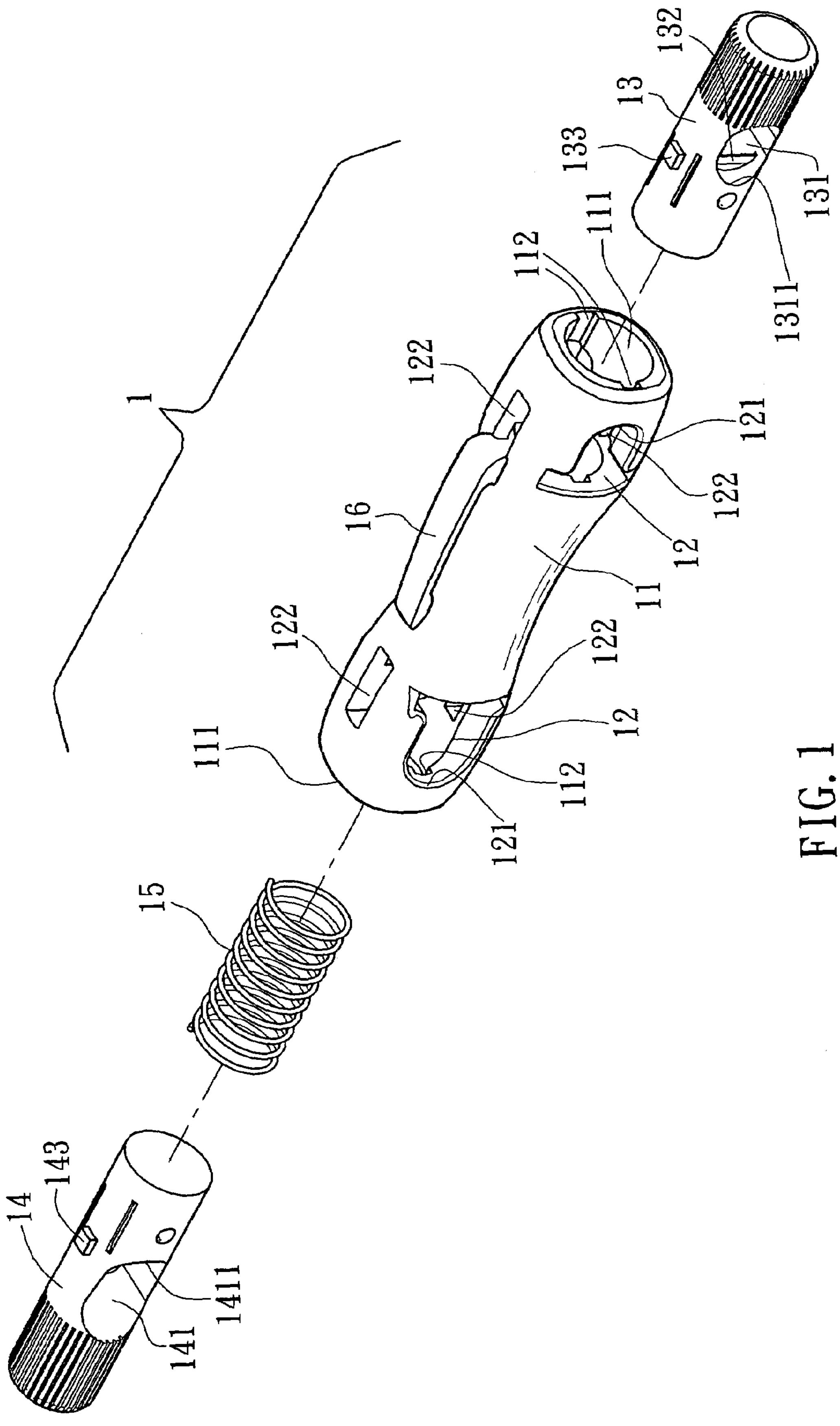
FIG. 1 is an exploded view of a coaxial cable stripper according to the present invention.
Figure 2:
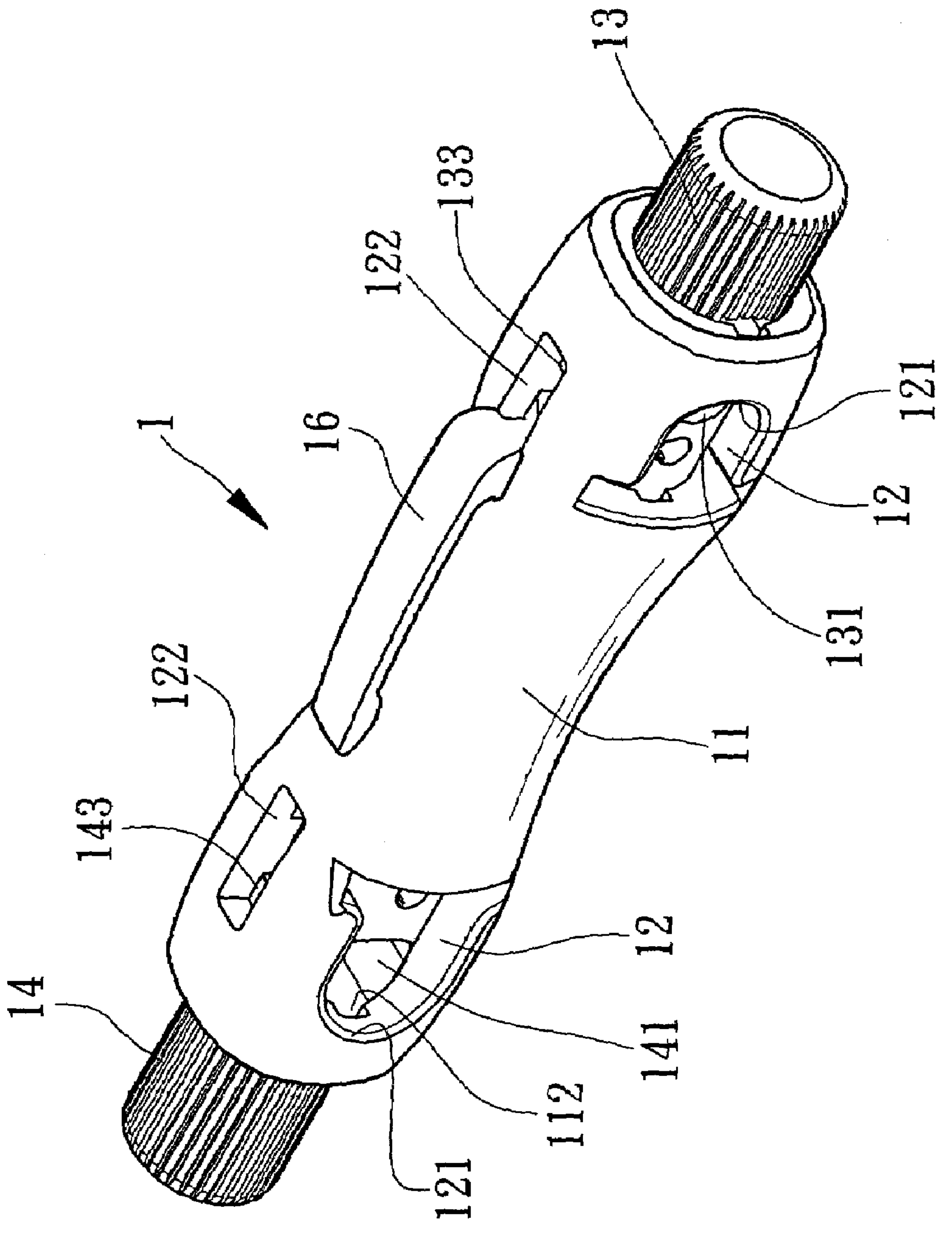
FIG. 2 is an elevational assembly view of the coaxial cable stripper according to the present invention.
Figure 3:
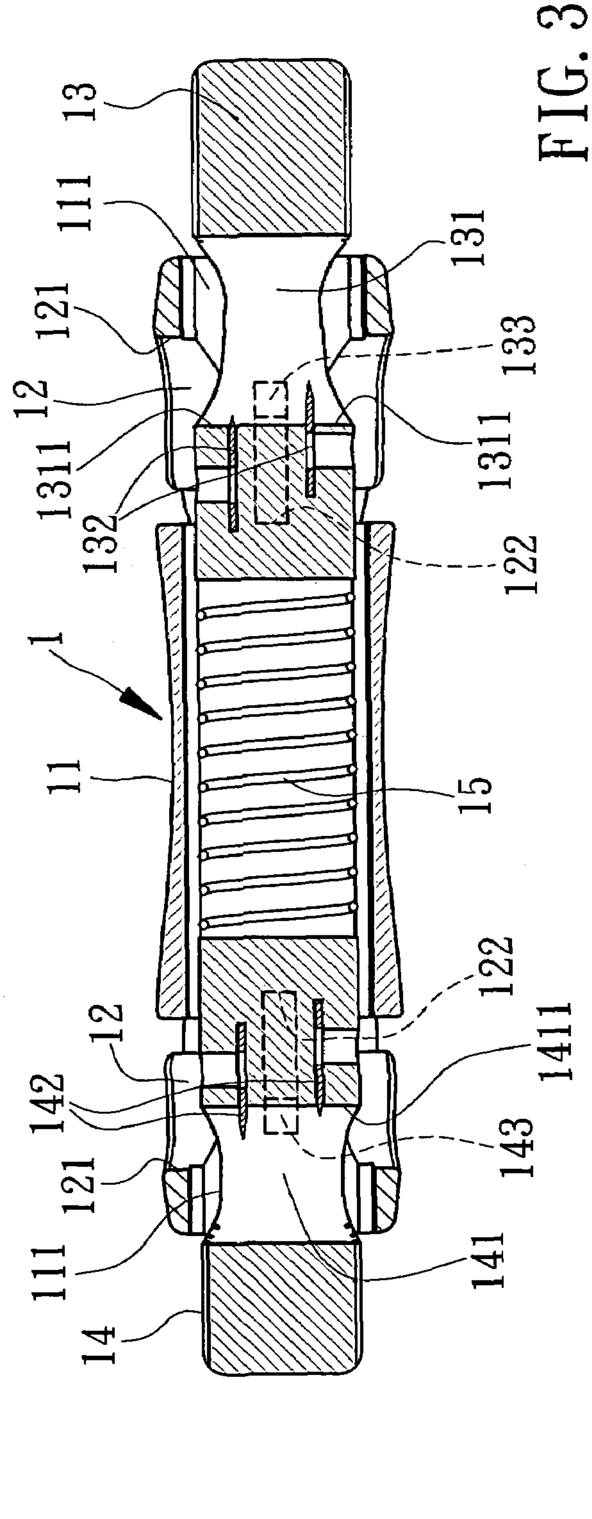
FIG. 3 is a longitudinal view in section of the coaxial cable stripper according to the present invention.

Referring to FIGS. 1~6, a coaxial cable stripper 1 in accordance with the present invention is shown comprising a hollow cylindrical body 11, a spring member 15, and two movable cutter holders 13 and 14. The hollow cylindrical body 11 has an axial through hole 111 extending through the two distal ends thereof. The spring member 15 is mounted inside the axial through hole 111 of the hollow cylindrical body 11. The two movable cutter holders 13 and 14 are respectively inserted into the two ends of the axial through hole 111 of the hollow cylindrical body 11 and respectively stopped against the two distal ends of the spring member 15, each having a transverse through hole 131 or 141 extending across the periphery on the middle for the insertion of a coaxial cable 2, two cutters 132 or 142 respectively axially mounted on the inside and partially projecting into the transverse through hole 131 or 141 at different depths. The hollow cylindrical body 11 has two transverse through holes 12 respectively extending across the axial through hole 111 near the two distal ends for the insertion of a coaxial cable 2 respectively, two pairs of sliding slots 122 respectively bilaterally formed in the peripheral wall near the two distal ends, two pairs of guide grooves 112 respectively longitudinally formed in the two distal ends of the axial through hole 111. Each transverse through hole 12 has an arched edge 121 at each of the two ends thereof. The two movable cutter holders 13 and 14 each further have two guide blocks 133 or 143 respectively protruded from the outside wall on the middle at two sides. During the assembly process of the coaxial cable stripper 1, the spring member 15 is mounted inside the axial through hole 111 of the hollow cylindrical body 11, and then the two movable cutter holders 13 and 14 are respectively inserted into the axial through hole 111 of the hollow cylindrical body 11 from the two ends of the hollow cylindrical body 11 to have the respective guide blocks 133 and 143 be inserted into the respective the guide grooves 112, and then two movable cutter holders 13 and 14 are respectively rotated through 90-degrees to force the respective guide blocks 133 and 143 into the respective sliding slots 122.

Figure 4:
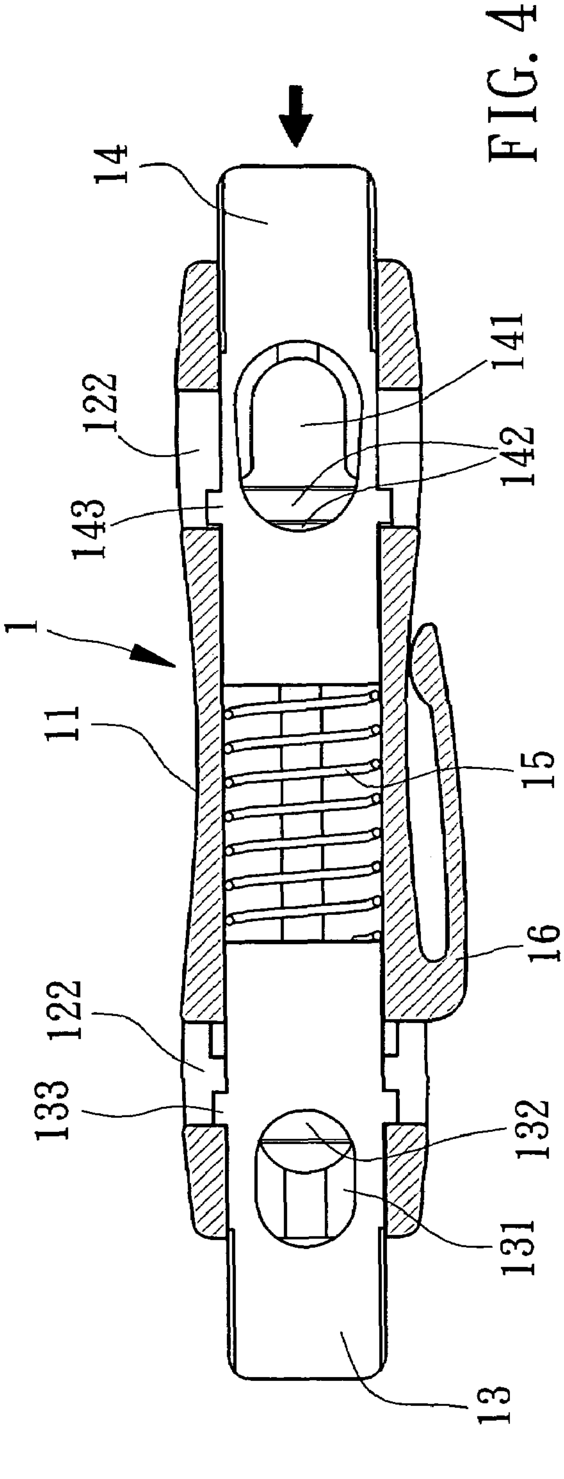
FIG. 4 is a schematic drawing showing one movable cutter holder of the coaxial cable stripper moved in axial direction relative to the hollow cylindrical body according to the present invention.
Figure 5:
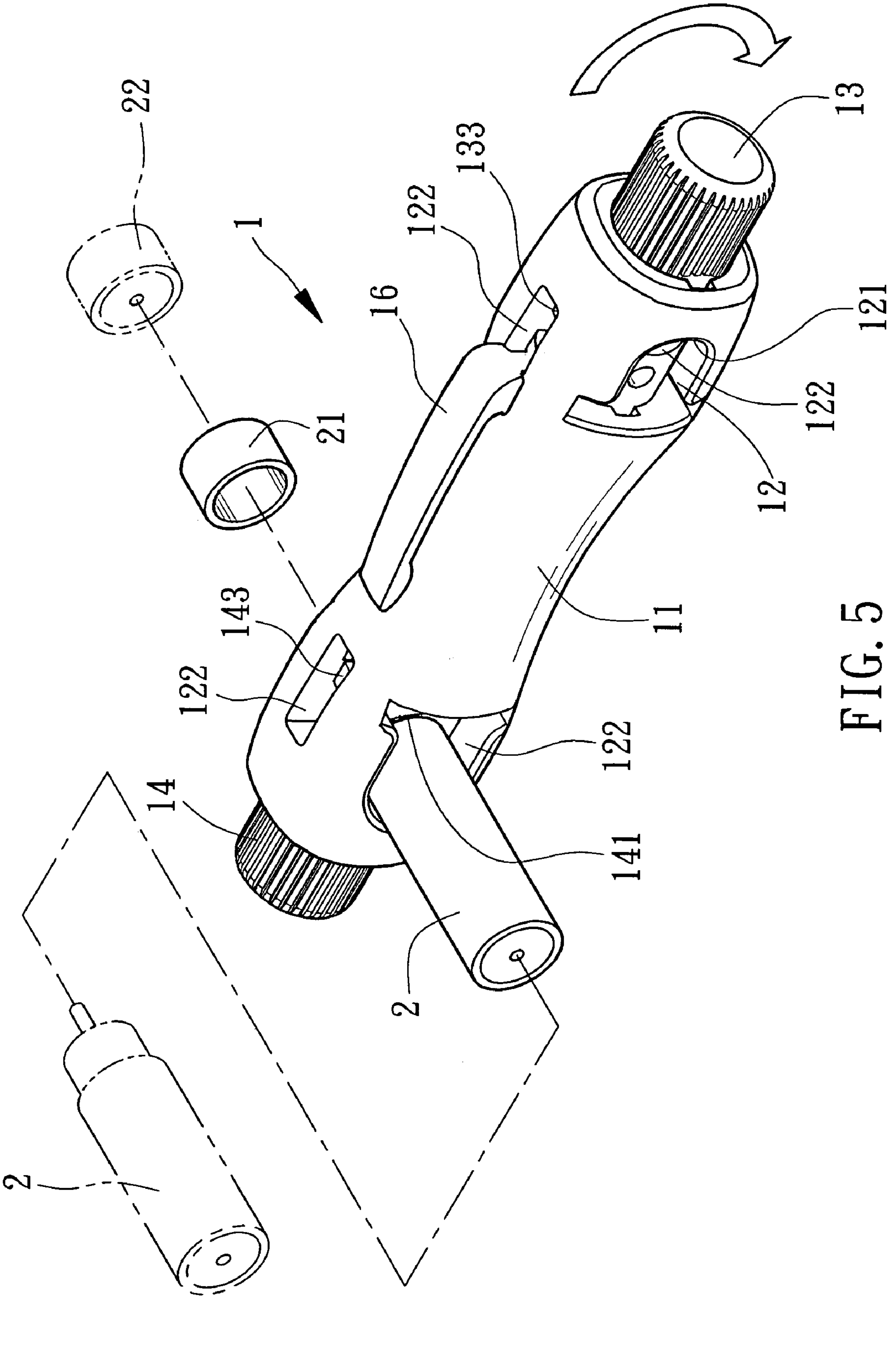
FIG. 5 is a schematic perspective view showing an operation example of the present invention.
Figure 6:
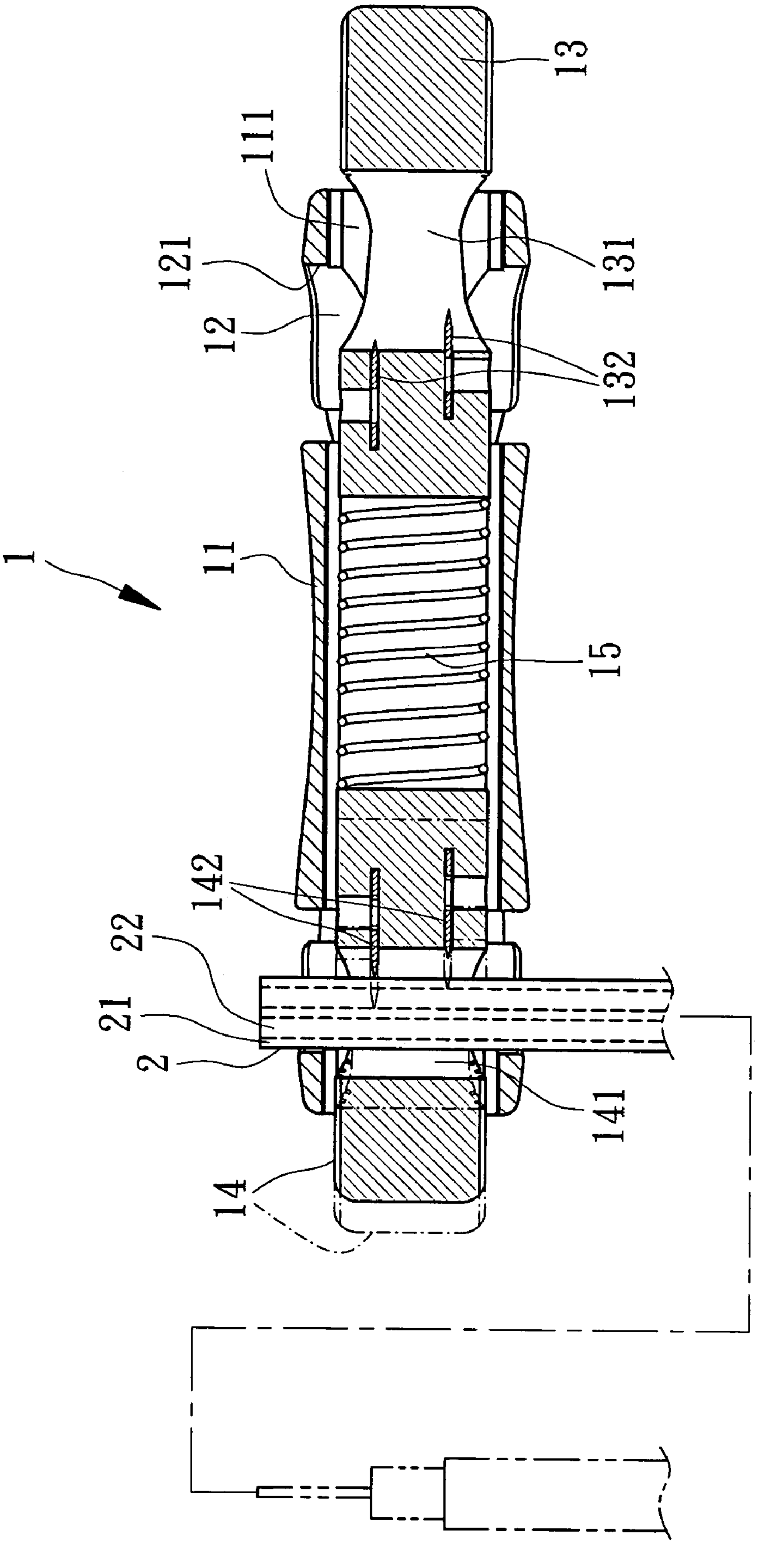
FIG. 6 is a schematic sectional view showing an operation example of the present invention.

Referring to FIGS. 4~6 again, when wishing to strip off a coaxial cable 2, push one movable cutter holder 13 inwards relative to the hollow cylindrical body 11 to increase the distance between the arched a coaxial cable 2 is inserted through the arched edge 121 at each end of the respective transverse through hole 12 of the hollow cylindrical body 11 and the inner side edge 1311 at each end of the transverse through hole 131 of the movable cutter holder 13 and to simultaneously compress the spring member 15, and then insert the coaxial cable 2 through the respective transverse through hole 12 of the hollow cylindrical body 11 and the transverse through hole 131 of the movable cutter holder 13, and then release the hand from the movable cutter holder 13, for enabling the spring member 15 to push the movable cutter holder 13 backwards to force the respective two cutters 132 against the coaxial cable 2, and then turn the coaxial cable stripper 1 around the coaxial cable 2 through 360-degrees, thereby causing the two cutters 132 to cut off the inner and outer insulative layers 22 and 21 of the coaxial cable 2.

Referring to FIGS. 1 and 2 again, the hollow cylindrical body 11 is externally provided with a clip 16 for fastening.

Figure 7:
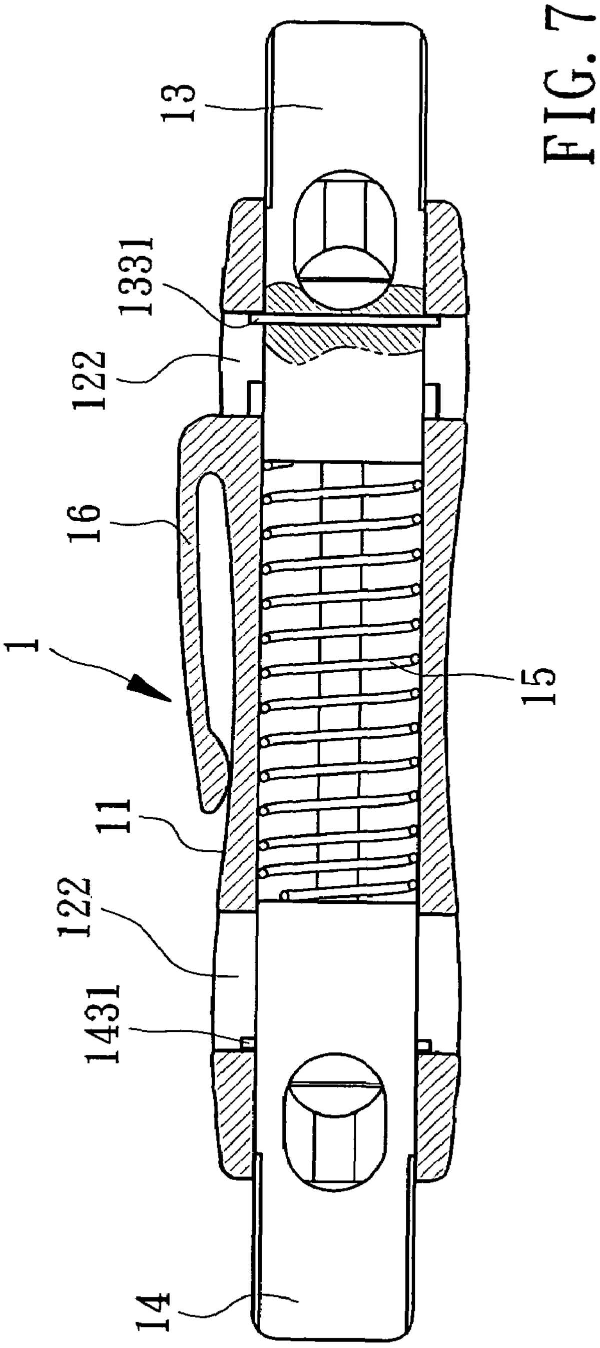
FIG. 7 is a sectional view showing an alternate form of coaxial cable stripper according to the present invention.

FIG. 7 shows an alternate form of the present invention. According to this embodiment, each movable cutter holder 13 or 14 has a transverse pin 1331 or 1431 respectively coupled to the sliding slots 122 of the hollow cylindrical body 11 for guiding axial movement of the respective movable cutter holder 13 or 14 relative to the hollow cylindrical body 11.

Figure 8:
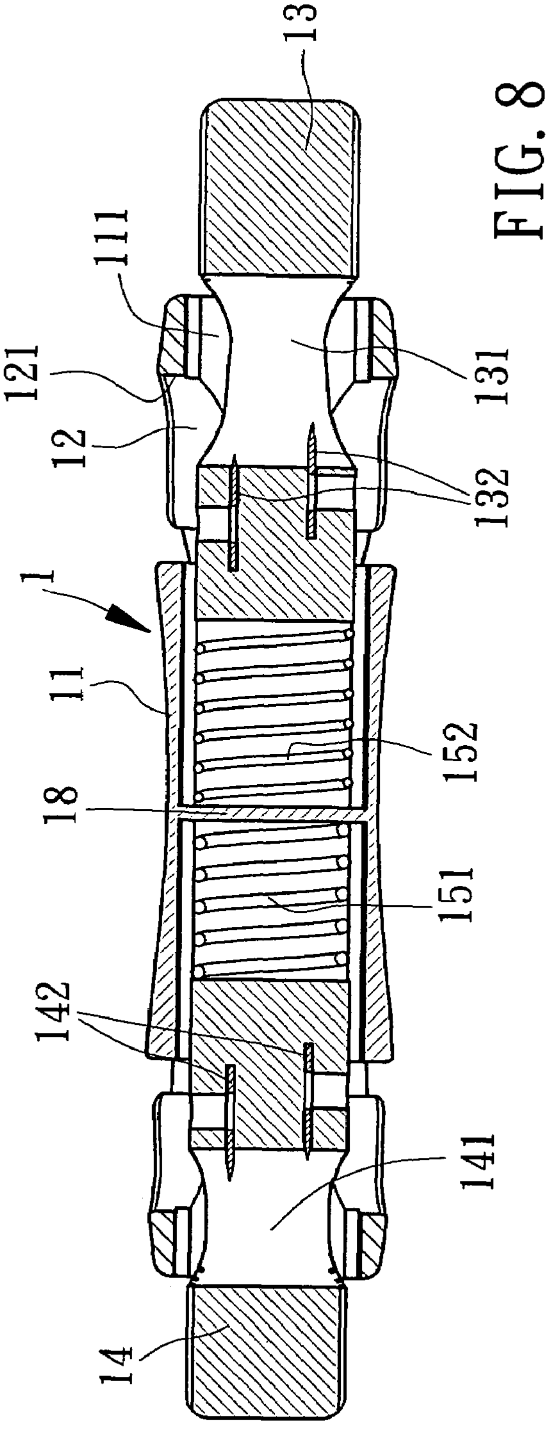
FIG. 8 is a sectional view showing another alternate form of the coaxial cable stripper according to the present invention.
Figure 9:
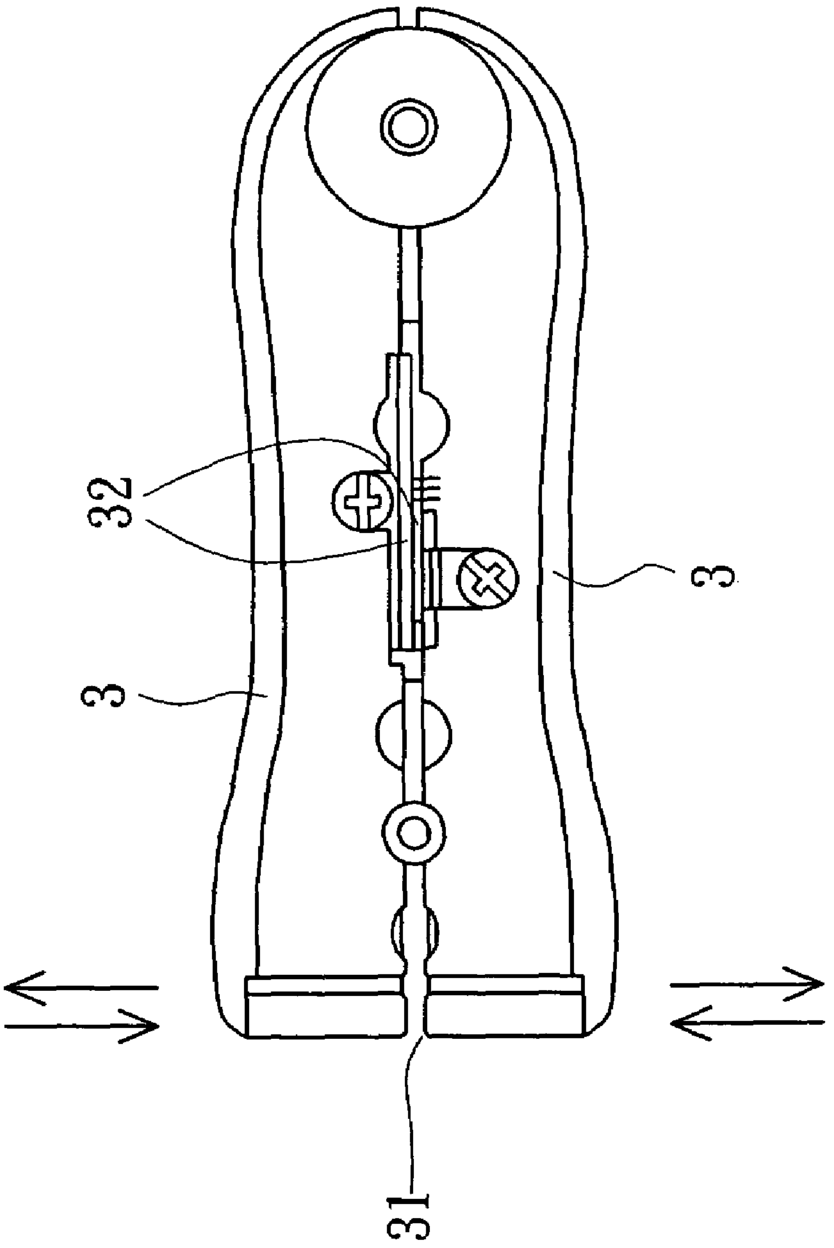
PRIOR ART FIG. 9
FIG. 9 is a schematic side plain view of a coaxial cable stripper according to the prior art.
Figure 10:
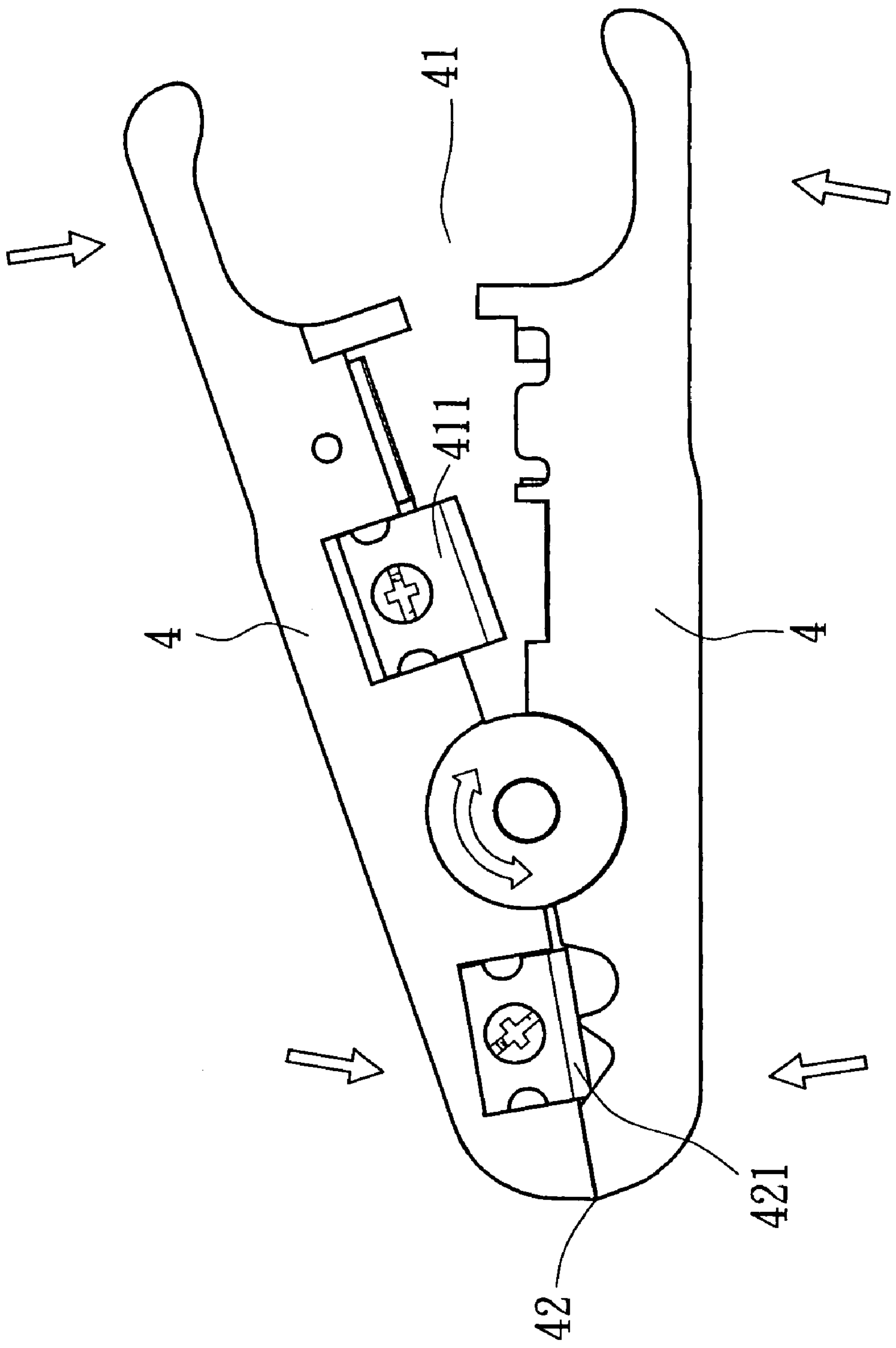
PRIOR ART FIG. 10
FIG. 10 is a schematic side plain view of another structure of coaxial cable stripper according to the prior art.

FIG. 8 shows another alternate form of the present invention. This embodiment is substantially similar to the embodiment shown in FIGS. 1~6 with the exception that the hollow cylindrical body 11 has a partition wall 18 disposed on the inside, which divides the axial through hole 111 into two separated receiving spaces, and two spring members 151 and 152 are respectively mounted inside the two separated receiving spaces to support a respective movable cutter holder 13 or 14. This embodiment achieves the same effect.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A coaxial cable stripper comprising:

a hollow cylindrical body, said hollow cylindrical body having an axial through hole extending through two distal ends thereof, and two transverse through holes extending across said axial through hole;

a spring member fixedly mounted inside the axial through hole of said hollow cylindrical body on the middle; and two movable cutter holders respectively coupled to two distal ends of the axial through hole of said hollow cylindrical body and axially movable relative to said hollow cylindrical body and respectively stopped against two distal ends of said spring member, said movable cutter holders each having a transverse through hole corresponding to the transverse through holes of said hollow cylindrical body for the insertion of a coaxial cable, and two cutters fixedly mounted on the inside and respectively axially projecting into the transverse through hole of the respective movable cutter holder at different depths for stripping off the outer and inner insulative layers of a coaxial cable.

2. The coaxial cable stripper as claimed in claim 1, wherein said hollow cylindrical body comprises a plurality of longitudinal sliding slots symmetrically disposed near two distal ends thereof; said movable cutter holders each have a plurality of guide blocks respectively coupled to the longitudinal sliding slots of said hollow cylindrical body for guiding axial movement of the respective movable cutter holder relative to said hollow cylindrical body.

3. The coaxial cable stripper as claimed in claim 2, wherein said hollow cylindrical body has a plurality of guide grooves formed inside said transverse through hole for guiding the guide blocks of said movable cutter holders into said longitudinal sliding slots.

4. The coaxial cable stripper as claimed in claim 1, wherein the transverse through holes of said hollow cylindrical body each have an arched edge at each of two distal ends thereof; the transverse through hole of each of said movable cutter holders has an inner arched edge at each of two distal ends thereof for acting with the arched edges at the two distal ends of one of the transverse through holes of said hollow cylindrical body to hold down a coaxial cable for cutting by the cutters of the respective movable cutter holder.

5. A coaxial cable stripper comprising:

a hollow cylindrical body, said hollow cylindrical body having an inside partition wall, two receiving spaces separated by said inside partition wall and respectively axially extending to two distal ends thereof, and two transverse through holes respectively extending across said two receiving spaces;

two spring members respectively fixedly mounted in the two receiving spaces inside said hollow cylindrical body; and two movable cutter holders respectively mounted in the two receiving spaces of said hollow cylindrical body and axially movable relative to said hollow cylindrical body and respectively stopped against said spring members, said movable cutter holders each having a transverse through hole corresponding to the transverse through holes of said hollow cylindrical body for the insertion of a coaxial cable, and two cutters fixedly mounted on the inside and respectively axially projecting into the transverse through hole of the respective movable cutter holder at different depths for stripping off the outer and inner insulative layers of a coaxial cable.

6. The coaxial cable stripper as claimed in claim 5, wherein said movable cutter holders each have a plurality of guide blocks respectively coupled to said hollow cylindrical body for guiding axial movement of the respective movable cutter holder relative to said hollow cylindrical body; said hollow cylindrical body comprises a plurality of longitudinal sliding slots symmetrically disposed in communication with said receiving spaces for receiving the guide blocks of said movable cutter holders, and a plurality of guide grooves formed on the inside for guiding the guide blocks of said movable cutter holders into said longitudinal sliding slots.

7. The coaxial cable stripper as claimed in claim 5, wherein the transverse through holes of said hollow cylindrical body each have an arched edge at each of two distal ends thereof; the transverse through hole of each of said movable cutter holders has an inner arched edge at each of two distal ends thereof for acting with the arched edges at the two distal ends of one of the transverse through holes of said hollow cylindrical body to hold down a coaxial cable for cutting by the cutters of the respective movable cutter holder.

* * * * *